Patented Apr. 24, 1951

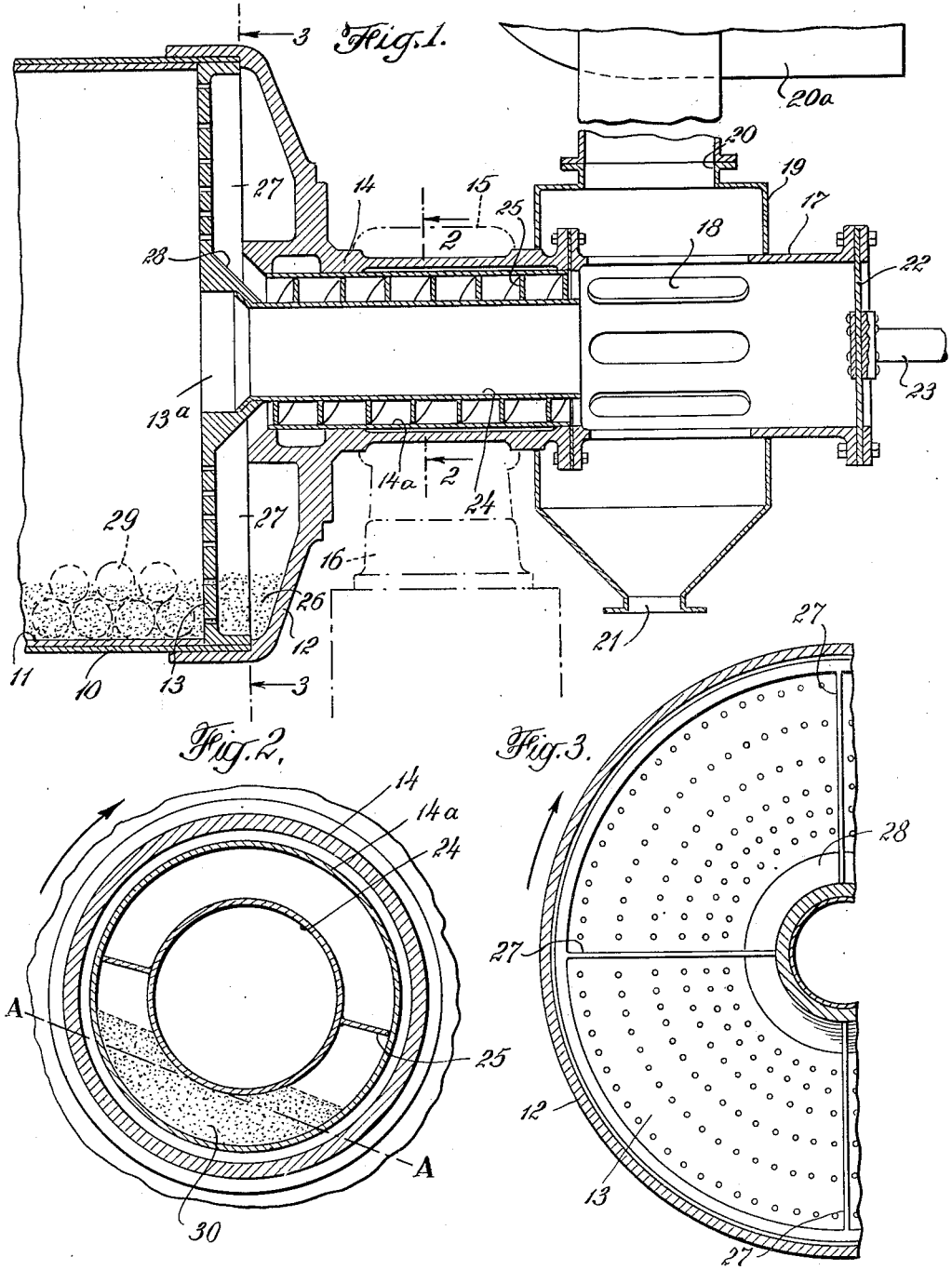

2,549,919

UNITED STATES PATENT OFFICE 2,549,919

AIRSWEPT ROTARY MILL OR DRUM HAVING SEPARATE DISCHARGE MEANS FOR AIR AND GROUND MATERIAL

Poul Moller, Copenhagen, Denmark, assignor to F. L. Smidth & Co., New York, N. Y., a corporation of New Jersey Application June 5, 1948, Serial No. 31,351
In Denmark June 6, 1947

2 Claims. (Cl. 241—54)

This invention relates to apparatus in which pulverulent material is treated in the presence of a current of air, an example of such apparatus being a rotary drum or grinding mill. More particularly, the invention is concerned with a novel apparatus of the type described so constructed that entrainment of dust particles by the air stream leaving the apparatus through the outlet is substantially reduced.

At the present time, it is frequently desirable to maintain a flow of air through an apparatus, such as a rotary grinding mill, for the purpose of cooling or drying the material being ground, or of creating a partial vacuum within the mill, which prevents escape of dust except through the outlet. When such a mill has a central outlet of reduced diameter at one end, through which the ground material is discharged and the air escapes, as is customary, the velocity of the air traveling through the outlet is higher than that of the air passing through the mill. As a consequence, the air traveling at relatively high velocity through the outlet picks up powdered material and carries it away. While it is usual to provide a filter for removing the dust from the discharging air stream, such a filter must be of substantial size and capacity to perform its functions properly and the provision of a suitable filter adds considerably to the cost of the mill.

The present invention is, accordingly, directed to the provision of an improved apparatus for treatment of pulverulent material in the presence of an air current, which is so constructed that entrainment of dust particles by the air passing through the outlet is substantially reduced. The desired result is obtained by constructing the mill or drum with an outlet duct divided by a partition into concentric passages, the air escaping through one of the passages and the material through the other. Preferably, the air escapes through the central passage and the material is conducted from the interior of the mill or drum through the outer passage, although the reverse arrangement may be used, if desired. The passage through which the material travels is provided with means, such as screw flights, with which the material cooperates to block the passage and thus prevent the travel of air therethrough. As the air traveling through its outlet passage is out of contact with the material, it carries so little dust that a small capacity filter is sufficient to recover the dust particles.

For a better understanding of the invention, reference may be had to the accompanying drawings, in which Fig. 1 is a longitudinal sectional view through a part of one form of apparatus of the invention;

Fig. 2 is a sectional view on the line 2—2 of Fig. 1; and

Fig. 3 is a partial sectional view on the line 3—3 of Fig. 1.

The new apparatus is illustrated in the drawing in the form of a grinding mill which includes a generally cylindrical shell 10 with a liner 11. At the discharge end of the mill, the end wall 12 is formed with a central opening of much less diameter than the shell, and a discharge grate 13 of conventional construction is disposed within the shell adjacent the outlet end.

A duct leads from the discharge opening and, in the construction illustrated, the duct takes the form of a hollow trunnion 14 running in a bearing 15 on a support 16 and provided with a liner 14a. A tubular extension 17 is secured to the end of the trunnion and the extension has openings 18 within a casing 19 having a top opening 20 and a bottom opening 21. The top opening of the casing is connected by a duct to the intake of a fan 20a and the fan draws air through the shell 10, the hollow trunnion 14, and extension 17, the air escaping through openings 18 in the extension and passing through the casing into the duct to the fan. The air leaving the fan is discharged directly to the atmosphere or passes through a filter, if desired. The ground material discharging through openings 18 at the bottom of the extension 17 leaves the casing through the opening 21. The end of the extension 17 is connected through a diaphragm coupling 22 to a shaft 23, by which the mill is rotated.

A tubular partition 24 is mounted within the hollow trunnion and extends the entire length of the latter. The grate 13 is provided with a central opening 13a and the end of the partition may enter that opening, if desired. The partition divides the interior of the trunnion into inner and outer concentric passages, and screw flights 25 are mounted on the wall of the partition within the outer passage. These flights are so constructed that, in the rotation of the mill, they advance material through the outer passage and discharge it into the trunnion extension 17.

Within the end of the mill between grate 13 and the outlet, means are provided for lifting the material 26, that has been sufficiently ground to pass through grate 13, from the bottom of the shell into the end of the outer passage within the trunnion. Such means may take the form of lifters 27, which are attached to the outer face of the grate and extend generally radially thereof. Adjacent the central opening 13a, the outer face of the grate is formed with a frusto-conical surface 28, along which material lifted by the lifters slides into the outer passage through the trunnion.

In the operation of the mill, the material is ground by the grinding bodies 29 within the shell and, during the grinding operation, a current of air at relatively low velocity is maintained through the mill. The air escapes through opening 13a and the interior of partition 24 into the trunnion extension 17, from which the air escapes through openings 18 in the casing 19. The sufficiently ground material, which passes through the grate and is elevated by the lifters 27, enters the outer passage between the outside of the partition 24 and the liner 14a of the trunnion. The material collects in the lower part of the outer passage, as indicated at 30, and the passage and flights are of such dimensions that, in the operation of the mill at normal capacity, the material between adjacent flights reaches at least the level A—A, so that the upper surface of the material makes contact with the outer surface of partition 24 and thus closes the passage between adjacent convolutions of the screw flights. As a result, air can not flow through the outer passage in the trunnion and must escape through the central passage, where it is out of contact with the material.

Since the central passage within the partition 24 is open at both ends and air can not flow through the outer passage through the trunnion, because of the material therein, all the air flowing through the mill escapes through the central outlet passage and none flows through the small openings in the grate. In its flow through the mill, the air tends to pick up some dust, but, by properly dimensioning the partition 24, the velocity of the stream escaping through that passage may be kept so low that little dust is carried out through the passage and into the casing 19.

I claim:

1. An apparatus, in which pulverulent material is treated in the presence of an air current, which comprises a shell of generally cylindrical form mounted for rotation on a substantially horizontal axis and having an outlet opening of relatively small diameter centrally of one end, a grate within the shell adjacent the outlet for preventing the passage of oversize material, a duct connected to the end of the shell around the outlet opening and extending co-axially of the shell, a cylindrical partition within the duct dividing it into inner and outer concentric passages for escape of air and material, respectively, from the shell, lifter means within the shell for delivering material from the interior of the shell into the outer passage, screw flights in the outer passage attached to the duct and partition, the flights advancing the material outwardly through the passage and cooperating with the material between them to prevent flow of air through the passage, a tubular extension from the duct, the extension having openings for escape of air and material, a drive shaft connected to the outer end of the extension, and a casing attached to the end of the duct and enclosing the part of the extension having the openings, the casing having a bottom opening for discharge of material and a top opening for escape of air.

2. An apparatus, in which pulverulent material is treated in the presence of an air current, which comprises a shell of generally cylindrical form mounted for rotation on a substantially horizontal axis and having an outlet opening of relatively small diameter centrally of one end, a grate within the shell adjacent the outlet for preventing the passage of oversize material, a duct connected to the end of the shell around the outlet opening and extending co-axially of the shell, a cylindrical partition within the duct dividing it into inner and outer concentric passages for escape of air and material, respectively, from the shell, lifter means within the shell for delivering material from the interior of the shell into the outer passage, screw flights in the outer passage attached to the duct and partition, the flights advancing the material outwardly through the passage and cooperating with the material between them to prevent flow of air through the passage, a tubular extension from the duct, the extension having openings for escape of air and material, a drive shaft connected to the outer end of the extension, a casing attached to the end of the duct and enclosing the part of the extension having openings, the casing having a bottom opening for discharge of material and a higher opening for escape of air, and a fan having its intake connected to the higher opening of the casing.

POUL MOLLER.

REFERENCES CITED

The following references are of record in the file of this patent:

UNITED STATES PATENTS

| Number | Name | Date |
|---|---|---|
| 1,139,651 | Easton | May 18, 1915 |
| 1,337,033 | Ball | Apr. 13, 1920 |
| 1,368,739 | Lindhard | Feb. 15, 1921 |
| 1,506,120 | Hardinge | Aug. 26, 1924 |
| 1,517,538 | Daman | Dec. 2, 1924 |
| 1,562,792 | Ruth | Nov. 24, 1925 |
| 1,569,930 | Herbst | Jan. 19, 1926 |
| 1,591,941 | Newhouse | July 6, 1926 |
| 1,606,545 | Van Saun | Nov. 9, 1926 |
| 1,609,298 | Kennedy | Dec. 7, 1926 |
| 1,780,132 | Jaedel | Oct. 28, 1930 |
| 2,399,051 | Maxson et al. | Apr. 23, 1946 |
| 2,405,633 | Barker et al. | Aug. 13, 1946 |